United States Patent Office 3,370,480
Patented Feb. 27, 1968

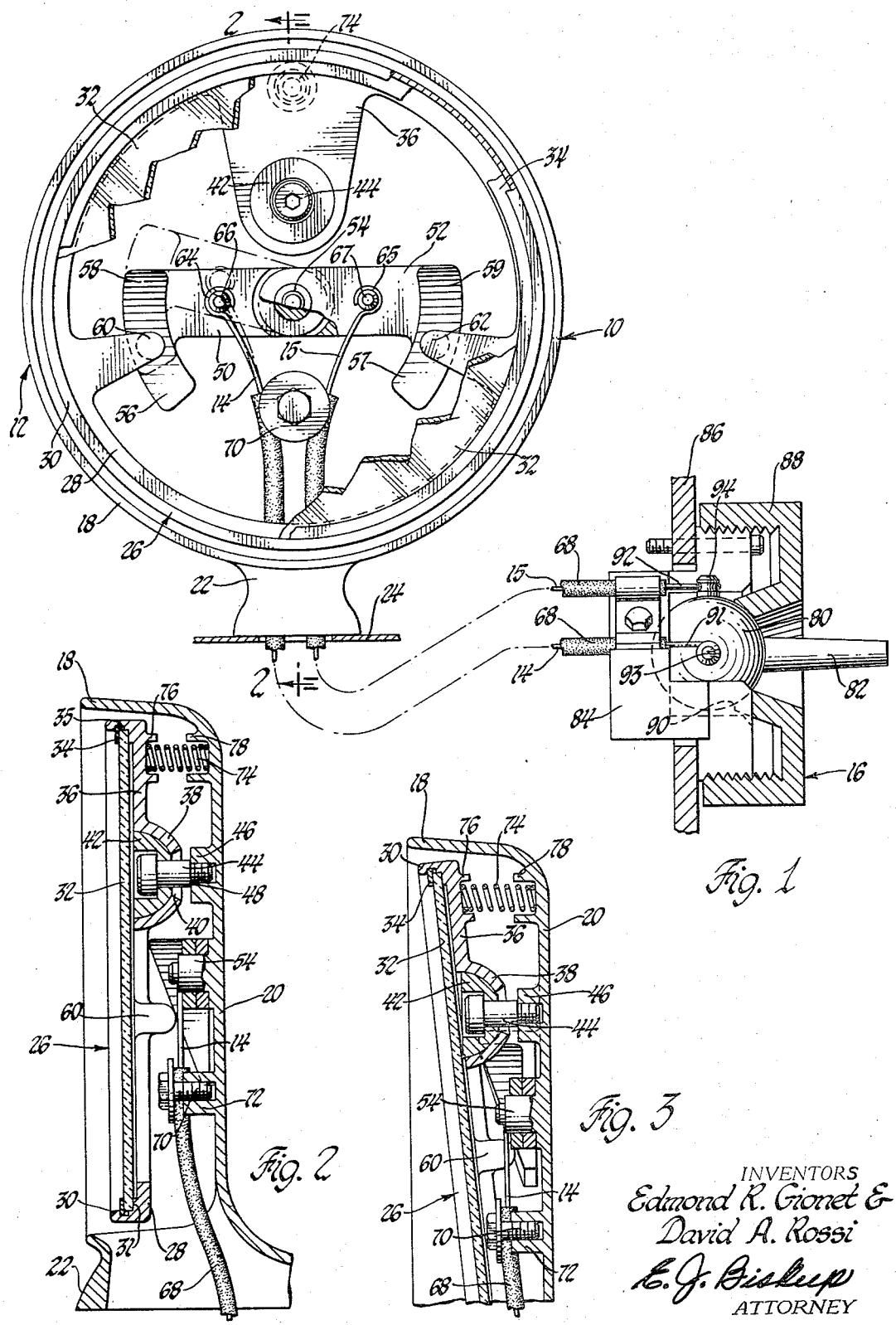

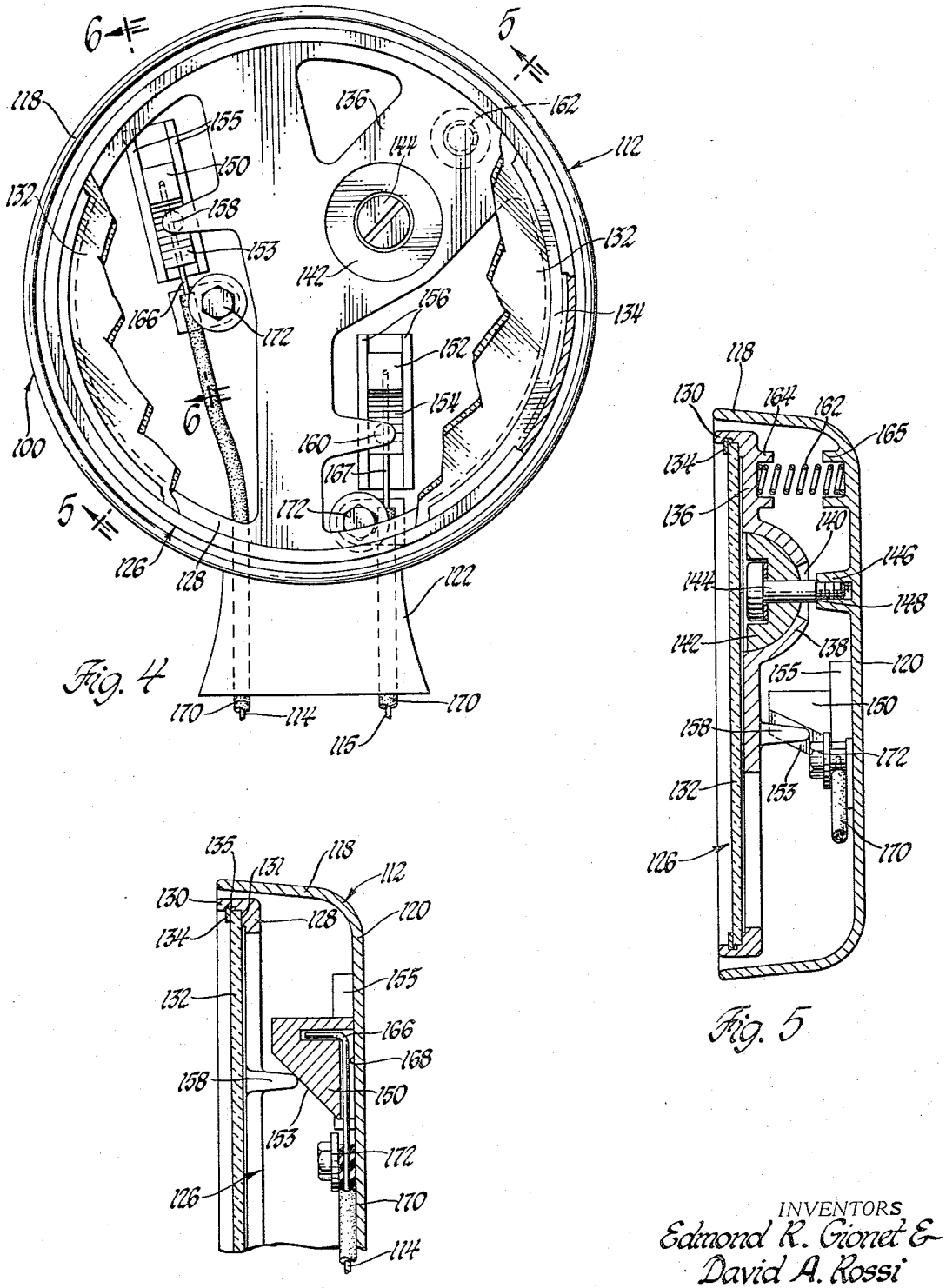

3,370,480
REMOTE CONTROL REAR VIEW MIRROR
Edmond R. Gionet, Warren, and David A. Rossi, New Baltimore, Mich., assignors to General Motors Corporation, Detroit, Mich., a corporation of Delaware
Filed Feb. 9, 1966, Ser. No. 526,160
7 Claims. (Cl. 74—501)

This invention relates to rear view mirrors and in particular to a remotely controlled rear view mirror for motor vehicles.

It has become desirable to provide present day motor vehicles with a remotely controlled outside rear view mirror which may be adjusted by the operator while he is seated within the vehicle. Such mirrors are desirable because of the convenience they offer in that they can be instantly and accurately adjusted from within the vehicle to give the operator a clear view to the rear of his vehicle. Such a mirror mechanism typically includes a mirror support which is angularly adjustable about horizontal and vertical axes through one or more flexible cables controlled by an actuator located within the vehicle passenger compartment.

A remotely controlled rear view mirror according to the present invention includes a housing mountable on the vehicle exterior sheet metal and a mirror support which is universally pivotally connected eccentrically to the housing. Pairs of cooperating camming members are provided to angularly position the mirror support about mutually perpendicular axes. In one preferred embodiment of the invention, cam support arms are rotatably secured to the housing and mount cam surfaces which are engaged by cooperating cam members fixedly located on the mirror support. Simultaneous rotation of the cam support arms at a uniform rate from a mirror support neutral position either in the same direction or in opposite directions causes the mirror support to pivotally adjust about vertical or horizontal axes respectively. Rotation of the arms individually or at a non-uniform rate causes pivotal movement of the mirror support about an axis intermediate the mutually perpendicular axes. In a second embodiment of the invention cam members are slidably movable within guides on the mirror housing and cooperating camming members are fixedly located on the mirror support. Individual movement of the cam members within the guides causes the mirror support to pivot about mutually perpendicular axes while simultaneous movement of the cam members pivots the mirror support about an axis intermediate the mutually perpendicular axes.

One feature of this invention is that the mirror support is positively angularly positioned relative to the mirror housing about horizontal and vertical axes by pairs of cooperating camming members which may be individually or simultaneously actuated.

Another feature of this invention is that the mirror support pivotal connection and the cooperating camming means are arranged for maximum operational efficiency within a mirror of compact dimensions.

Still another feature of this invention is that the paired camming members are positively spring biased into engagement.

A more complete understanding of the invention can be derived from the following detailed description with reference to the accompanying drawings in which:

FIGURE 1 is a partially broken away view of a remotely controlled rear view mirror according to the present invention;

FIGURE 2 is a sectional view taken generally in a plane defined by the line 2—2 of FIGURE 1;

FIGURE 3 is a partial view similar to FIGURE 2 but showing the mirror support in another position;

FIGURE 4 is a view similar to FIGURE 1 but showing another embodiment of the invention;

FIGURE 5 is a sectional view taken generally in a plane defined by the line 5—5 of FIGURE 4; and FIGURE 6 is a sectional view taken generally in a plane defined by the line 6—6 of FIGURE 4.

Referring to FIGURE 1, there is shown a remotely controlled rear view mirror mechanism 10 according to this invention which comprises a rear view mirror 12, flexible cables 14 and 15, and a manually operable remotely located actuator 16.

The mirror 12 includes a cylindrical housing 18 having an end plate 20 and a mounting bracket or base 22 by which the mirror is secured to a suitable surface 24 in a conventional manner. A mirror support 26 is located within the housing 18 and includes a support ring 28 and an axially extending rim 30 about the outer periphery of the ring 28 which forms a seating surface 31 to receive a mirror element 32. A retaining ring 34 seats within a groove 35 about the inner circumference of the rim 30 to hold the mirror element 32 in place. The ring 28 has a radially inwardly extending segment 36 with a hemispherical depression or socket 38 therein which has an aperture 40. A hemispherical ball segment 42 seats within the socket 38 and is centrally drilled and counterbored to receive a cap screw 44 which extends through the aperture 40 and is threadingly received within a boss 46 formed at an eccentric point on the plate 20. A shoulder 48 of the cap screw 44 seats on the outer surface of boss 46 to position the mirror support within the housing. When so positioned, the mirror support 26 is universally pivotally movable within housing 18 about the ball segment 42.

As best seen in FIGURE 1, radially outwardly extending cam support arms 50, 52 are rotatably mounted for independent movement on a boss 54 formed with plate 20 at the geometric center of the housing and have arcuate segments 56 and 57, respectively, formed at their outer extremities. Cam ramps or surfaces 58, 59 formed on the segments 56, 57 are engaged by axially extending cam follower members 60 and 62, respectively, which are formed on the mirror support 26. Cam arms 50, 52 are operatively connected to the flexible cables 14, 15 by the cable end portions 64, 65 which suitably attach at convenient points along the arms. As shown, the end portions 64, 65 form eyelets which attach about pin members 66, 67 secured in the cam arms. The cables 14, 15 are protectively encased but axially movable within sheaths 68 which have outer end portions secured to plate 20 by cap screw and washer combination 70 threadingly received within boss 72. A compression spring 74 has the end portions thereof seated within bosses 76, 78 formed with the mirror support 26 and housing 12, respectively. The spring 74 is located radially outward of pivotal socket 38 and at a point about the circumference of the mirror support 26 opposite the cam members 60, 62 so that the spring biasing force will continuously hold the paired cam members in engagement.

The actuator 16 for rotatably positioning the arms 50, 52 about the boss 54 is located within the vehicle passenger compartment near the vehicle operator and includes a ball member 80 with outwardly extending lever 82. The ball member 80 seats within a mating socket of a first bracket member 84 which is suitably fastened within an opening in support wall 86. A second or outer bracket member 88 is threadingly received about the member 84 and is centrally apertured so that the lever 82 is accessible to the vehicle operator. The outer member 88 may be threadably tightened upon member 84 until the arcuate surface 90 of member 88 seats tightly against the ball 80 to lock the ball and lever in position within the members 84 and 88. With the actuator locked, the mirror support is secured against unintentional movement. The sheaths 68 have inner end portions received within and secured to the member 84 while the cables 14, 15 have inner end portions 91, 92 terminating in eyelets which are secured about recessed portions of pins 93, 94 projecting from the surface of ball 80 in a manner allowing the pins to rotate freely with the cable eyelets. The cables 14 and 15, however, are axially movable in tension or compression in response to curvilinear movement of the pins 93, 94. The pins 93, 94 are circumferentially located 90° apart in mutually perpendicular planes intersecting at the center of ball 80. Thus, when the lever 82 is oscillated or moved in a horizontal plane in FIGURE 1 the pin 93 and attached cable 14 are moved forwardly and rearwardly to actuate the arm 50. The cable 15, however, remains stationary since pin 94 merely rotates within the cable eyelet. Similarly, if lever 82 is oscillated in a vertical plane in FIGURE 1, pin 94 and attached cable 15 are moved forwardly and rearwardly to actuate the arm 52 while cable 14 remains motionless. If the lever is moved in a plane located between the horizontal and vertical planes, both cables will be simultaneously actuated.

As best seen in FIGURES 1 and 2, the mirror support 26 is in a neutral position about horizontal and vertical axes when the arms 50, 52 lie in a horizontal plane which is perpendicular to a plane passing through the center of the socket 38 and the center of the housing 18. To adjust the mirror from the neutral position the vehicle operator need only grasp the lever 82 and move it to a predetermined position for realizing a corresponding movement of the mirror support 26. For example, to adjust the mirror support about a vertical axis, the lever is moved in a plane causing cables 14, 15 to simultaneously rotate arms 50, 52 at a uniform rate in the same direction. The inclined cam surfaces 58, 59 are thus adjusted relative to cam members 60, 62 to angularly position the mirror support 26 about a vertical axis. Similarly, to adjust the mirror support about a horizontal axis, the lever is moved in a plane causing cables 14, 15 to simultaneously rotate arms 50, 52 at a uniform rate but in opposite directions. If the lever is moved so that arms 50, 52 are rotated individually, or simultaneously but not at a uniform rate, the mirror support 26 will be positioned about an axis intermediate the horizontal and vertical axes.

FIGURE 4 shows a second embodiment of the present invention. According to this embodiment a rear view mirror mechanism 100 includes a rear view mirror 112, flexible cables 114, 115 and an actuator (not shown) constructed the same as the actuator 16 of the first embodiment. The mirror 112 includes a cylindrical housing 118 having an end plate 120 and a mounting bracket or base 122 by which the mirror may be secured to any suitable surface in a conventional manner. A mirror support 126 is located within the housing 118 and includes a webbed support ring 128 and an axially extending rim 130 about the outer periphery of the ring 128 which forms a seating surface 131 to receive a mirror element 132. A retaining ring 134 seats within a groove 135 about the inner circumference of the rim 130 to hold the mirror element 132 in place. The ring 128 includes a web section 136 with a hemispherical depression or socket 138 therein which has an aperture 140. A hemispherical ball segment 142 is received within the socket 138 and is centrally drilled and counter-bored to receive the shouldered head of a cap screw 144 which passes through the socket aperture 140 and is threadingly received within a boss 146 formed eccentrically on the plate 120. A shoulder 148 on the cap screw 144 seats on the outer surface of the boss 146 to position the mirror support within the housing. The mirror support 126 is thus universally pivotally movable within the housing 118 upon the ball segment 142.

As best seen in FIGURE 4, cooperating pairs of camming members are provided to position the mirror support about mutually perpendicular axes. Cam members 150, 152 with inclined surfaces or ramps 153, 154 are mounted on the plate 120 and are slidably movable within guide rails 155, 156. The cam members 150, 152 are engaged by axially extending cam follower members 158 and 160, respectively, which are fixedly formed on the web section 136. Cam members 158 and 160 are respectively located in generally horizontal and vertical planes which pass through the center of the eccentrically positioned socket 138. It may be seen that the cam pair 150, 158 when actuated separately is effective to position the mirror support about a vertical axis and that cam pair 152, 160 when actuated separately is effective to position the mirror support about a horizontal axis. If both cam pairs are simultaneously operated, the mirror support will be positioned about an intermediate axis. A compression spring 162 is located between bosses 164, 165 formed with the mirror support and housing and is located radially outward of the pivotal socket 138 at a point about the mirror support where its biasing force will hold the cooperating pairs of cam members in continuous engagement.

Cam members 150, 152 are movable within their guides by flexible cables 114, 115 which have inner end portions 166, 167 suitably attached thereto. End portion 166, as seen in FIGURE 6, has a right-angle bend which is retained within a similarly shaped channel 168 within the cam member 150. Cable 115 is similarly attached to cam member 152. The cables 114, 115 are protectively encased but axially movable within sheaths 170 which have end portions secured to the plate 120 by suitable securing means 172. The opposite end portions of the cables 114, 115 and sheaths 170 are attached to a remotely located actuator in the same manner as described in the first embodiment. The actuator is not shown in FIGURE 4 since its construction and operation is identical to that previously described.

The mirror support 126 is pivotally positioned about horizontal and vertical axes by selectively actuating the cables 114, 115 to cause controlled movement of cam members 150, 152 within their guides. For example, if cam member 150 is moved downward in FIGURE 4 in response to axial movement of cable 114 it may be seen that the cam member 158 will ride up the inclined surface 153 causing the mirror support to pivot about a vertical axis against the biasing force of the spring 162. If the cam member 150 is moved upwardly, the mirror support will pivot in the opposite direction about a vertical axis. Similar movement of the cam member 152 will cause the mirror support to pivot about a horizontal axis. Of course, the mirror support need not be positioned separately about horizontal and vertical axes, but both cam members 150, 152 may be moved simultaneously by a proper manipulation of the actuator to adjust the mirror support to the desired position about an intermediate axis.

While preferred embodimens of the invention have been shown and described, it will be understood that the invention includes any and all modifications falling within the scope of the following claims.

We claim:

1. A remotely controlled rear view mirror comprising, a housing, a mirror support, means universally pivotally connecting the mirror support eccentrically to the housing, first and second members mounted on the housing for independent movement relative thereto, cooperating camming means formed with the mirror support and said first and second members for pivotally positioning the mirror support about mutually perpendicular axes upon movement of said first and second members relative to the housing, means located between said housing and said mirror support for biasing said cooperating camming means into continuous engagement, first and second axially displaceable means for imparting movement to said first and second members, and manually operated remotely located actuation means for selectively imparting movement to said first and second axially displaceable means.

2. The invention recited in claim 1 wherein said first and second members include radially extending cam support arms independently rotatable about an axis passing through the center of said housing, each of said arms having a cam surface engaged by a cooperating cam member formed on the mirror support whereby simultaneous uniform rotation of said arms from a mirror support neutral position causes said mirror support to pivot about mutually perpendicular axes and non-uniform rotation of said arms causes said mirror support to pivot about an axis intermediate said mutually perpendicular axes.

3. The invention recited in claim 2 wherein said mirror support is at a neutral position when said cam support arms lie in a plane perpendicular to a plane passing through the center of the mirror support pivotal connection and the center of the housing, and simultaneous uniform rotation of said arms from said neutral position in the same direction causes said mirror support to pivot about a vertical axis and simultaneous uniform rotation of said arms from said neutral position in opposite directions causes said mirror support to pivot about a horizontal axis.

4. The invention recited in claim 1 wherein said first and second members are slidably movable within guide rails formed with the housing and each of said members has a cam surface engaged by a cooperating cam member formed on the mirror support, said first and second members being independently movable relative to said cooperating cam members to position said mirror support about mutually perpendicular axes and simultaneously movable to position said mirror support about an axis intermediate said mutually perpendicular axes.

5. The invention recited in claim 4 wherein the points of engagement of said cooperating cam members lie in generally mutually perpendicular planes passing through the center of the mirror support pivotal connection.

6. The invention recited in claim 3 wherein said biasing means is a compression spring having end portions seated within bosses formed with the housing and mirror support and located radially outward of the mirror support pivotal connection and at a point about the mirror support opposite the cooperating camming means for biasing said cam members into continuous engagement.

7. The invention recited in claim 2 wherein the first and second means are flexible cables operable in tension and compression and having first and second end portions secured to said first and second members and said actuation means respectively.

References Cited
UNITED STATES PATENTS

| 3,077,142 | 2/1963 | Jacobson | 74—501 |
| 3,191,498 | 6/1965 | Priebe | 74—501 |
| 3,229,581 | 1/1966 | Walter | 350—288 |

FOREIGN PATENTS

| 1,025,369 | 4/1966 | Great Britain. |

FRED C. MATTERN, JR., *Primary Examiner.*

W. S. RATLIFF, *Assistant Examiner.*